(12) United States Patent
Tani et al.

(10) Patent No.: US 7,605,966 B2
(45) Date of Patent: Oct. 20, 2009

(54) OPTICAL DEFLECTOR

(75) Inventors: Masanao Tani, Kanagawa (JP);
Yoshiaki Yasuda, Kanagawa (JP);
Masahiro Akamatsu, Kanagawa (JP);
Takanori Aimono, Kanagawa (JP)

(73) Assignee: Stanley Electric Co., Ltd. (JP)

( * ) Notice: Subject to any disclaimer, the term of this patent is extended or adjusted under 35 U.S.C. 154(b) by 0 days.

(21) Appl. No.: 12/357,106

(22) Filed: Jan. 21, 2009

(65) Prior Publication Data

US 2009/0185253 A1 Jul. 23, 2009

Related U.S. Application Data

(63) Continuation-in-part of application No. 12/355,044, filed on Jan. 16, 2009.

(30) Foreign Application Priority Data

Jan. 21, 2008 (JP) .............................. 2008-010060
Jan. 21, 2008 (JP) .............................. 2008-010061

(51) Int. Cl.
*G02B 26/08* (2006.01)

(52) U.S. Cl. .............. 359/224.1; 359/199.1; 359/199.4; 359/200.8; 310/311

(58) Field of Classification Search .... 359/224.1–224.2
See application file for complete search history.

(56) References Cited

U.S. PATENT DOCUMENTS

| 6,995,499 | B2 * | 2/2006 | Hwang | .......................... 310/328 |
| 7,061,063 | B2 | 6/2006 | Kato et al. | |
| 7,391,222 | B2 | 6/2008 | Nishio | |
| 2003/0168942 | A1 * | 9/2003 | Iino et al. | .................... 310/331 |
| 2008/0297868 | A1 * | 12/2008 | Mizumoto | ................... 359/199 |

FOREIGN PATENT DOCUMENTS

| JP | 2000-235152 A | 8/2000 |
| JP | 2001-179180 A | 7/2001 |
| JP | 2001-234331 A | 8/2001 |
| JP | 2002-177765 A | 6/2002 |
| JP | 2003-81694 A | 3/2003 |
| JP | 2004-034256 A | 2/2004 |
| JP | 2004-226548 A | 8/2004 |
| JP | 2004-264702 A | 9/2004 |
| JP | 2004-347713 A | 12/2004 |
| JP | 2005-128147 A | 5/2005 |
| JP | 2005-148147 A | 6/2005 |
| JP | 2005-148459 A | 6/2005 |
| JP | 2006-184603 A | 7/2006 |

* cited by examiner

*Primary Examiner*—James Phan
(74) *Attorney, Agent, or Firm*—Chen Yoshimura LLP

(57) ABSTRACT

An optical deflector includes a mirror having a reflective plane; a torsion bar extending outwardly from an end of said mirror; a support surrounding said mirror; a first piezoelectric element, one end of said first piezoelectric element being connected to said torsion bar, the other end of the first piezoelectric element being connected to and supported by said support, said first piezoelectric element having at least one piezoelectric cantilever, the cantilever including a supporting body and a piezoelectric body formed on the supporting body to exhibit bending deformation due to piezoelectricity when a driving voltage is applied to the piezoelectric body, said piezoelectric element rotarily driving said mirror through said torsion bar when said driving voltage is applied; and a second piezoelectric element, one end of said second piezoelectric element being connected to said torsion bar, the other end of the second piezoelectric element being connected to and supported by said mirror.

17 Claims, 7 Drawing Sheets

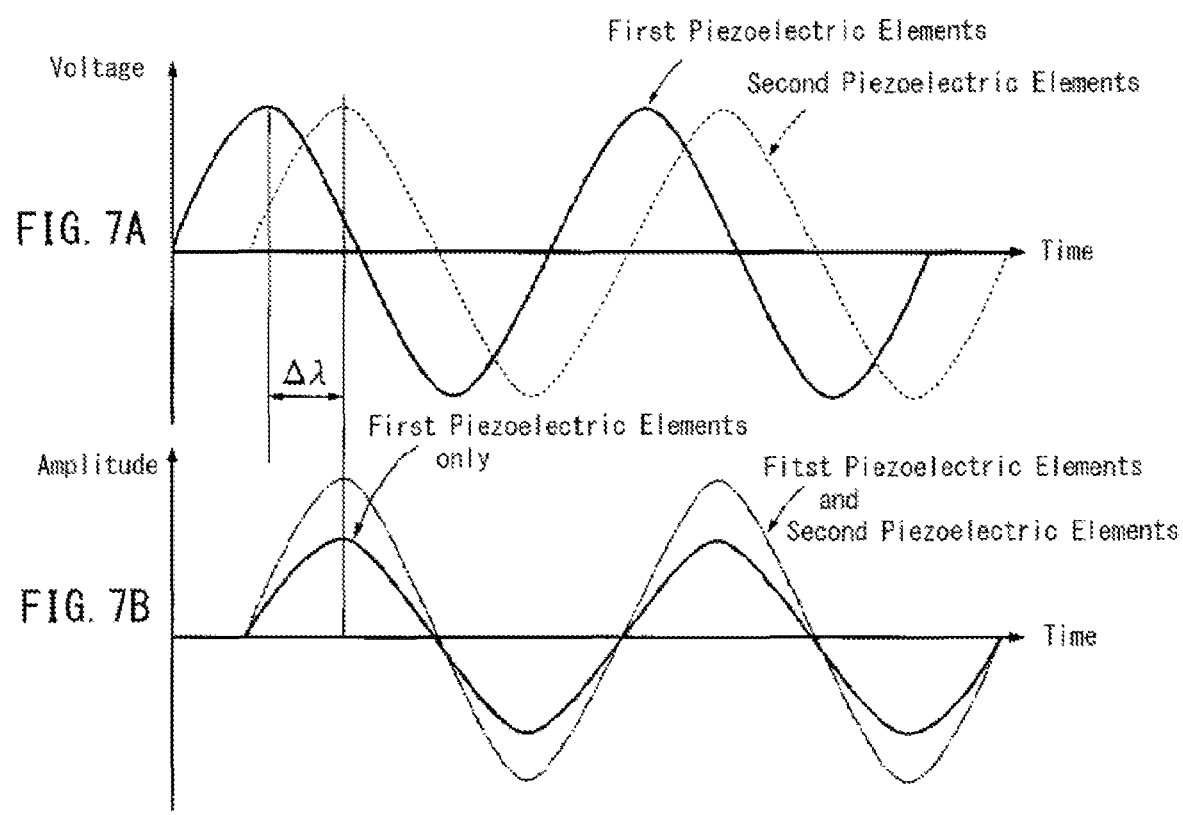

OPTICAL DEFLECTOR

This application is a continuation-in-part of application Ser. No. 12/355,044, filed Jan. 16, 2009, which is hereby incorporated by reference in its entirety.

BACKGROUND OF THE INVENTION

1. Field of the Invention

The present invention relates to an optical deflector for deflecting and sweeping a light beam such as a laser beam.

2. Description of the Related Art

Recently, as a MEMS (micro electro mechanical systems) device using semiconductor processes and the micro machining technology, an optical deflector has been proposed in which a mirror (a reflecting board) and electromechanical parts such as movable parts for the rotary drive of the mirror are formed integrally on a semiconductor substrate. In the optical deflector, in order to improve the deflection and sweeping performance further, it is desired that the drive status (e.g., the deflection angle and the deflection velocity) is controlled fast and precisely. For that purpose, the feedback control is required by detecting the drive status (e.g., a rotation angle) of the mirror.

As a method to detect the rotation angle of the mirror, an example is a technique in which laser light deflected/swept by the mirror is detected by a separately provided sensor. However, in this technique, the system size is increased. To avoid this problem, techniques have been proposed in which an optical deflector itself carries a detection mechanism (See e.g., Patent Documents 1-3).

In the optical deflector in Patent Document 1, an end of a movable frame part is connected to and supported by a stationary part, and a torque, which is generated in the movable frame part, is transmitted to a torsion bar (an elastic beam) which is connected to the other end of the movable frame part, to rotarily drive a mirror which is installed at the end of the torsion bar. A piezoresistive element is built in the anchor part of the elastic beam on the side of the frame to detect the twist angle of the elastic beam, thereby detecting the rotation angle of the mirror. The optical deflector in Patent Document 2 utilizes an electromagnetic drive method in which a sensor for detecting the variation of the magnetic field is installed to detect the angle of the mirror that has a thin film of hard magnet. The optical deflector in Patent Document 3 utilizes an electrostatic drive method in which the electrostatic capacitance between the mirror and an electrode facing the mirror is measured to detect the angle.

(Patent Document 1)
Japanese Laid-open Patent Application, Application No. 2004-226548

(Patent Document 2)
Japanese Laid-open Patent Application, Application No. 2000-235152

(Patent Document 3)
Japanese Laid-open Patent Application, Application No. 2006-184603

(Patent Document 4)
Japanese Laid-open Patent Application, Application No. 2005-128147

On the other hand, an optical deflector that uses a piezoelectric drive method using piezoelectric actuators as the driving source of the mirror has been proposed (See, e.g., Patent Document 4). In the optical deflector, one end of the piezoelectric actuator is connected to and supported by the frame part (the support), and a torque, which is generated by the piezoelectric actuator, is transmitted to the other end of the torsion bar (the elastic beam) to rotarily drive the mirror that is installed at the end of the torsion bar. Advantages of this optical deflector are: it is small in size; it can provide a large driving force with a simple structure; and it is easy to be manufactured and mass-produced.

In this optical deflector using piezoelectric actuators, in order to detect the rotation angle of the mirror, one may consider utilizing the technique disclosed in Patent Document 1: that is, the rotation angle of the mirror is detected by detecting the twist angle of the elastic beam by a piezoresistance element or a strain gauge installed at the anchor end part (on the side of the support) of the torsion bar which supports the mirror. However, due to the built-in piezoresistance elements or strain gauges, a complex structure would result.

On the other hand, instead of the piezoresistant element, one may consider installing a separate piezoelectric sensor to detect the angle displacement by the piezoelectric electromotive force, or installing additional wiring for a sensor to the piezoelectric actuator besides the wiring for driving the piezoelectric actuator. In this case, the detection mechanism can be formed by using the manufacturing process of the piezoelectric actuator for driving the mirror.

However, because the twist displacement of the torsion bar is minute, it is difficult to measure the twist displacement with a good S/N ratio. Furthermore, because the position of the piezoelectric sensor is close to the piezoelectric actuator, a crosstalk of the sensor signal with the driving signal of the piezoelectric signal is a problem.

Furthermore, recently, as MEMS (micro electro mechanical systems) devices that utilize a semiconductor process and/or a micro machining technology, optical deflectors (a micro optical scanner) in which mirrors and piezoelectric actuators are formed integrally on a semiconductor substrate have been proposed (See, e.g., Patent References 5-7). In these optical deflectors, an end of a piezoelectric actuator is connected to and supported by a frame part (a support), and a torque, which is generated in the piezoelectric actuator, is transmitted to a torsion bar (an elastic beam) which is connected to another end of the piezoelectric actuator, to rotarily drive a mirror attached to an end of the torsion bar.

Foreign Patent Document 5: Laid-open Patent Application 2001-179180

Foreign Patent Document 6: Laid-open Patent Application 2005-128147

Foreign Patent Document 7: Laid-open Patent Application 2005-148459

In these types of optical deflector, in order to improve the deflection/scanning performances, it is desirable to increase the maximum deflection angle and to control the deflection angle and the deflection velocity faster with greater precision. Further, in order to rotarily drive a mirror, these optical deflectors have moving parts (such as torsion bars and piezoelectric actuators) that may break or deteriorate when an excessive load is applied. Therefore, it is necessary to control the deflection angle and the deflection velocity within certain respective ranges such that the moving parts are not overloaded even when the moving parts are rotarily driven at its maximum allowed angle.

But, in the optical deflector of Patent Document 5, there exists a limit to the control performance of the deflection angle and the deflection velocity, because of the structure of the optical deflector by which the torque generated by the piezoelectric actuator is transmitted to the mirror through the torsion bar. Furthermore, the maximum deflection angle of the optical deflector is mostly determined by the torque generated by the piezoelectric actuator, the material and the shape of the torsion bar, and the shape and the weight of the mirror.

Therefore, in order to obtain a larger deflection angle for the optical deflector of Patent Document 5 with same material and the same shape of the torsion bar and with the same shape and the same weight of the mirror, the torque generated by the piezoelectric actuator must be made larger. And in order to generate a larger torque by the piezoelectric actuator, one may consider increasing the size of the piezoelectric actuator, increasing the voltage applied to the piezoelectric actuator, and improving the property of the piezoelectric actuator, But, increasing the size of the piezoelectric actuator leads to an increase in size of the overall device, resulting in a smaller number of chips per wafer. On the other hand, increasing the applied voltage to the piezoelectric actuator causes an increase in the power consumption of the device, and necessitates circuits that can operate with a higher operational voltage. Furthermore, it is technically difficult to improve the properties of the piezoelectric actuator due to limitations on the physical properties of piezoelectric materials.

SUMMARY OF THE INVENTION

Accordingly, the present invention is directed to an optical deflector that substantially obviates one or more of the problems due to limitations and disadvantages of the related art.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, according to one aspect of the present invention, there is provided an optical deflector including: a mirror having a reflective plane; a torsion bar extending outwardly from an end of the mirror; a support surrounding the mirror; a first piezoelectric element having one or more piezoelectric cantilevers, one end of the piezoelectric cantilever being connected to the torsion bar, the other end being connected to and supported by the support, the piezoelectric cantilever including a piezoelectric material formed on a supporting body to exhibit bending deformation due to piezoelectricity when a driving voltage is applied thereto, the mirror being rotarily driven through the torsion bar by applying the driving voltage to the first piezoelectric element; and a second piezoelectric element having one or more piezoelectric cantilevers, one end of the piezoelectric cantilever being connected to the torsion bar, the other end being connected to and supported by the mirror, the piezoelectric cantilever including a piezoelectric material formed on a supporting body to exhibit bending deformation due to piezoelectricity when a driving voltage is applied thereto.

According to the first aspect of the optical deflector, because the second piezoelectric element is installed between the mirror and the torsion bar, when the mirror is driven rotarily by driving the first piezoelectric element, a deforming force is applied to the second piezoelectric element, which results in generating the piezoelectric electromotive force in the piezoelectric cantilever. Since the piezoelectric electromotive force reflects the driving status of the mirror, based on the piezoelectric electromotive force of the second piezoelectric element, it is possible to detect the driving status of the mirror quickly with high precision and to control the driving status of the mirror. On the other hand, if instead a driving voltage is applied to the second piezoelectric element, the second piezoelectric element exhibits a bending deformation that directly affects the driving status of the mirror. Therefore, it is possible to control the driving status of the mirror based on the bending deformation of the second piezoelectric element (using it as an actuator). Thus, by use of the second piezoelectric element, the driving status of the mirror can be detected and/or controlled quickly with high precision.

In the first aspect of the optical deflector, a detector may be provided to detect the piezoelectric electromotive force that is generated in response to the bending deformation of the piezoelectric cantilever of the second piezoelectric element caused by the drive of the mirror so that the rotation angle of the mirror is determined based on the detected piezoelectric electromotive force (the second aspect).

In the second aspect of the optical deflector, because the bending deformation of the second piezoelectric element directly reflects the driving status of the mirror, by detecting the piezoelectric electromotive force due to the bending deformation, the rotation angle of the mirror can be detected quickly with precision.

In the first or second aspect of the optical deflector, the optical deflector system may include a control unit to control the driving voltage applied to the first piezoelectric element so that a parameter of the rotary drive of the mirror is set to a desired value using the rotation angle determined by the detector (the third aspect).

In the third aspect of the optical deflector, because the rotation angle of the mirror is detected by the rotation angle detector quickly with high precision, the first piezoelectric element can be feedback-controlled so that one or more parameters of rotary drive of the mirror (e.g., the deflection angle and the deflection velocity) can be set to a desired value(s), thereby achieving fast and precise deflection and sweeping operations.

In the first through third aspects of the optical deflector, one pair or two pairs of the first piezoelectric elements (acting as actuators) may be installed face to face across the mirror and across a pair of the torsion bars that respectively extend outwardly from both ends of the mirror so that the mirror is driven rotarily by the one pair or two pairs of the first piezoelectric elements (the fourth aspect).

In the fourth aspect of the optical deflector, through the one pair or two pairs of the first piezoelectric elements (actuators) that are installed face to face across the mirror and the torsion bars, the mirror can be driven rotarily around one axis by driving the first piezoelectric elements (actuators). Therefore, the mirror can be rotated around the single axis in a controlled manner, and it is possible to achieve desired deflection and sweeping/scanning operations in one rotational direction in a compact optical deflector.

In the fourth aspect of the optical deflector, one pair or two pairs of the second piezoelectric elements may preferably be installed face to face across the mirror to generate the piezoelectric electromotive force in response to the bending deformations caused by the rotary oscillation of the mirror that is caused by the one pair or two pairs of the first piezoelectric elements (actuators). The thus generated piezoelectric electromotive force may be detected and processed by the above-mentioned rotational angle detector to determine the rotational angle of the mirror (the fifth aspect).

In the fifth aspect of the optical deflector, because the one pair or two pairs of the second piezoelectric elements are installed face to face across the mirror, the rotation angle of the mirror is reliably detected during the rotary oscillation of the mirror using the piezoelectric electromotive force which is generated in the second piezoelectric elements.

In the first through the fifth aspects of the optical deflector, the driving voltage applied to the above-mentioned one or two pairs of the first piezoelectric elements may preferably be alternating current voltages (the sixth aspect).

In the sixth aspect of the optical deflector, the sweeping of the light can be performed by the rotary oscillation of the mirror around one axis by the drive of the first piezoelectric elements (acting as actuators) which are placed face to face across the torsion bar. In the sweeping of the light, the sweeping angle of the mirror can be detected quickly with high precision by the rotation angle detector.

In the sixth aspect of the optical deflector, a first alternated current voltage applied to the one pair or two pairs of the first piezoelectric elements on one side of the torsion bar may preferably be set to be different from a second alternating current voltage applied on the other side of the torsion bar by 180 degrees in phase (the seventh aspect).

In the seventh aspect of the optical deflector, sweeping of the light can be performed by efficient rotary oscillation of the mirror around the torsion bar as a rotation axis by having the reverse-phased bending deformations of the piezoelectric cantilevers of the first piezoelectric elements placed face to face across a torsion bar. During the light sweeping/scanning operation, the sweeping/scanning angle of the mirror can be detected quickly with high precision by the rotation angle detection (processing) unit.

In the first through the seventh aspects of the optical deflector, it is preferred that the mirror, the torsion bar, the support, and the supporting body of the piezoelectric cantilever are formed integrally by patterning a semiconductor substrate (the eighth aspect).

According to the eighth aspect of the optical deflector, because the mirror, the torsion bar, the support, and the supporting body of piezoelectric cantilever are fabricated integrally by the patterning process, there is no need for a joint member or glue which would be required if elements were made individually and the device were to be formed by the fabrication method using joints and gluing, etc. Also the accuracy of the alignment is improved, and the device can be formed easily and precisely. Because of the integral formation of the device, the entire optical deflector is connected mechanically, and no stress is concentrated on the connection parts contrary to the case where the individually formed parts are connected. Therefore, the mechanical strength of the optical deflector is improved. Furthermore, because the optical deflectors can be formed by using a semiconductor substrate (e.g., a single crystal silicon substrate, or a silicon substrate such as an SOI substrate, etc.), the optical deflectors can be formed integrally with ease by the process of removing appropriate portions of the semiconductor substrate using a semiconductor planer process and a MEMS process.

In the eighth aspect of the optical deflector, it is preferred that the piezoelectric material of the piezoelectric cantilever is formed by patterning a single layer of piezoelectric film which is directly formed over the semiconductor substrate (the ninth aspect).

In the ninth aspect of the optical deflector, because the piezoelectric material of the piezoelectric cantilever is formed by patterning the single layer of piezoelectric film which is directly formed over the semiconductor substrate, the optical deflector has a simple structure and is easily formed using a semiconductor planer process. Furthermore, because the supporting body and the piezoelectric materials are formed integrally, there is no need for glue which would be necessary if the supporting body and the piezoelectric materials were formed separately and glued. Thus, the accuracy of the alignment is improved, no stress is concentrated at the connecting parts, and the mechanical strength of the piezoelectric element is improved.

In the ninth aspect of the optical deflector, it is preferable that the reflecting plane of the mirror and the electrodes of the piezoelectric cantilever are formed by patterning a thin metal film which is directly deposited over the semiconductor substrate and by patterning a thin metal film formed over the piezoelectric film, respectively (the tenth aspect).

In the tenth aspect of the optical deflector, because the reflecting plane of the mirror and the electrode of the piezoelectric cantilever are formed by patterning the same layer of thin metal film, the structure is simple and can be formed by a semiconductor planer process with ease.

In another aspect of the present invention, there is provided an optical deflector including: a mirror having a reflective plane; a torsion bar extending outwardly from an end of the mirror; a support surrounding the mirror; a first piezoelectric element having one or more piezoelectric cantilevers, one end of the piezoelectric cantilever being connected to the torsion bar, the other end being connected to and supported by the support, the piezoelectric cantilever including a piezoelectric material formed on a supporting body to exhibit bending deformation due to piezoelectricity when a driving voltage is applied thereto; a controller that controls a voltage applied to the first piezoelectric element to thereby control a rotary drive of the mirror through the first piezoelectric element; a second piezoelectric element having one or more piezoelectric cantilevers, one end of the piezoelectric cantilever being connected to the torsion bar, the other end being connected to and supported by the mirror, the piezoelectric cantilever including a piezoelectric material formed on a supporting body to exhibit bending deformation due to piezoelectricity when a driving voltage is applied thereto; and an adjusting unit that adjusts a rotary drive of the mirror which is driven rotarily by the first piezoelectric element, by controlling a voltage applied to the second piezoelectric element (the eleventh aspect).

According to the eleventh aspect, because the second piezoelectric element is installed between the mirror and the torsion bar and acts as an actuator, when the mirror is rotarily driven by the drive of the first piezoelectric element, it is possible to apply an additional rotary torque to the torsion bar by the drive of the second piezoelectric element in addition to the rotary torque by the drive of the first piezoelectric element. The rotary torque by the drive of the second piezoelectric element directly affects the status of the rotary drive of the mirror. Therefore, during the drive of the first piezoelectric element by using the controller, it is possible to adjust the rotary drive of the mirror by driving the second piezoelectric element in a controlled manner using the adjusting unit. The deflection angle can be increased, for example, and the driving status of the mirror can be controlled quickly with high precision.

In the eleventh aspect of the optical deflector, the voltage applied to the second piezoelectric element may preferably be controlled so that the deflection angle of the mirror caused by the rotary drive is increased (the twelfth aspect).

In the twelfth aspect of the optical deflector, while the driving voltage applied to the first piezoelectric element is controlled by the controller (e.g., at least one of the phase, the frequency, and the amplitude of the driving voltage is controlled), the driving voltage applied to the second piezoelectric element is controlled by the adjusting unit quickly in a controlled manner (e.g., at least one of the phase, the frequency, and the amplitude of the driving voltage is controlled) such that the deflection angle of the mirror caused by the rotary drive is increased as a result. This way, it is possible to rotarily drive the mirror with a larger deflection angle, thereby improving the deflection and sweeping/scanning performances.

In the eleventh aspect of the optical deflector, it is also possible to have the aforementioned controller control the voltage applied to the second piezoelectric element such that a parameter of the rotary drive of the mirror is set to a desired target value (the thirteenth aspect).

According to the thirteenth aspect of the optical deflector, while the voltage applied to the first piezoelectric element is controlled by the controller (e.g., at least one of the phase, the frequency, and the amplitude of the driving voltage is controlled), the driving voltage applied to the second piezoelectric element is controlled by the adjusting unit (e.g., at least one of the phase, the frequency, and the amplitude of the driving voltage is controlled) in a speedy and controlled manner such that a parameter of the rotary drive of the mirror (e.g., the resonant frequency) is set to be a desired target value. Therefore, even if a parameter of the rotary drive deviates from a designed value, it is possible to adjust and substantially eliminate the deviation, thereby achieving desired deflection and sweeping/scanning performances.

In the eleventh aspect of the optical deflector, the adjusting unit may be configured to control the driving voltage applied to the second piezoelectric element such that a parameter of the rotary drive of the mirror by the first piezoelectric element or a parameter of the rotary drive of the torsion bar in relation to the rotary drive of the mirror is set to be within a desired range (the fourteenth aspect).

According to the fourteenth aspect of the optical deflector, while the voltage applied to the first piezoelectric element is controlled by the control mean (e.g., at least one of the phase, the frequency, and the amplitude of the driving voltage is controlled), the driving voltage applied to the second piezoelectric element is controlled by the adjusting unit (e.g., at least one of the phase, the frequency, and the amplitude of the driving voltage is controlled) in a speedy and controlled manner such that a parameter of the rotary drive of the mirror (e.g., the deflection angle, the deflection velocity, and the phase) or a parameter of the rotary drive of the torsion bar (e.g., the twist displacement, the displacement velocity, and the phase) is set to be within a desired range. By limiting a parameter of the rotary drive of the mirror or the torsion bar in this way, the mirror and the torsion bar can be driven within a range where the mirror or the torsion bar are not deteriorated or damaged.

In the eleventh through fourteenth aspects of the optical deflector, one pair or two pairs of the first piezoelectric elements may be installed face to face across the mirror and across a pair of the torsion bars that respectively extend outwardly from the both ends of the mirror. Also, one pair or two pairs of the second piezoelectric elements may be installed face to face across the mirror. Then, the mirror is driven rotarily by the one or two pairs of the first piezoelectric elements and by the one or two pairs of the second piezoelectric elements (the fifteenth aspect).

According to the fifteenth aspect of the optical deflector, the one or two pairs of the first piezoelectric elements and the one or two pairs of the second piezoelectric elements are installed face to face across the mirror and the torsion bars, and the mirror can be driven rotarily around a single axis by the drive of the first piezoelectric elements and the second piezoelectric elements. Thus, by adjusting the rotary drive caused by the first piezoelectric elements using the second piezoelectric elements, the mirror can be driven rotarily around a single axis with precision with a larger deflection angle or with a desired deflection angle or deflection velocity.

As a result, desired deflection and scanning performances in one rotational direction can be obtained stably and efficiently.

In the eleventh through fifteenth aspects of the present invention, the voltages respectively applied to one or two pairs of the first piezoelectric elements and to one or two pairs of the second piezoelectric elements may preferably be alternating current voltages (the sixteenth aspect).

According to the sixteenth aspect of the optical deflector, by driving the first piezoelectric elements and the second piezoelectric elements which are placed face to face across the torsion bars, the sweeping of the light can be done by the rotary oscillation of the mirror around a single axis. Here the rotary oscillation caused by the first piezoelectric elements can be adjusted by the second piezoelectric elements. As a result, the light sweeping/scanning operation can be performed in a precise and controlled manner with a larger deflection angle or with a desired deflection angle or sweeping frequency.

In the sixteenth aspect of the optical deflector, it is preferred that in the one or two pairs of the first and second piezoelectric elements, a first alternating current voltage which is applied to the piezoelectric materials of the piezoelectric cantilevers of the piezoelectric elements on one side of the torsion bar is different from a second alternating current voltage which is applied to the piezoelectric materials of the piezoelectric cantilevers of the piezoelectric elements on the other side of the torsion bar by 180 degree in phase (the seventeenth aspect).

According to the seventeenth aspect of the optical deflector, by using the bending deformations in a reverse phase with respect to one another of the piezoelectric cantilevers that oppose to each other across the torsion bar for each pair of the piezoelectric elements, the light sweeping/scanning operation can be performed through efficient rotary oscillation of the mirror around the torsion bar as a rotation axis. Because the rotary oscillation of the mirror by the first piezoelectric elements can be adjusted by the second piezoelectric elements, the light sweeping/scanning operation can be performed in a precise and controlled manner with a larger deflection angle or with a desired deflection angle or sweeping frequency.

In the eleventh through the seventeenth aspects of the present invention, the mirror, the torsion bars, the support, and the supporting bodies of the piezoelectric cantilevers may preferably be formed integrally by patterning a semiconductor substrate (the eighteenth aspect).

According to the eighteenth aspect of the present invention, because the mirror, the torsion bar, the support, and the supporting bodies of piezoelectric cantilevers are formed integrally by patterning a semiconductor substrate, no connecting part or glue, etc., is necessary contrary to the case where those parts are made individually and the device is formed by the fabrication method using jointing and gluing, etc. Therefore, the accuracy of the alignment is improved, and the device can be formed easily and precisely. Because of the integral formation of the device, the entire optical deflector is connected mechanically, and therefore, no stress is concentrated on the connection parts contrary to the case where parts are individually formed and jointed. Thus, the mechanical strength of the optical deflector is improved. Furthermore, because the optical deflector is formed by using a semiconductor substrate (e.g., a single crystal silicon substrate, or a silicon substrate such as an SOI substrate, etc.), the optical deflector can be formed integrally with ease by removing appropriate portions of the semiconductor substrate using a semiconductor planer process and a MEMS process.

In the eighteenth aspect of the optical deflector, it is preferred that the piezoelectric material of the piezoelectric cantilever is formed by patterning a single layer of piezoelectric film which is directly formed over the semiconductor substrate (the nineteenth aspect).

According to the nineteenth aspect of the optical deflector, because the piezoelectric material of the piezoelectric cantilever is formed by patterning the single layer of piezoelectric film which is directly formed over the semiconductor substrate, the optical deflector has a simple structure and is easily be formed by using a semiconductor planer process. Furthermore, because the supporting body and the piezoelectric material are formed integrally, no glue is necessary contrary to the case where the supporting body and the piezoelectric material are formed separately and glued. Thus, the accuracy of the alignment is improved, no stress is concentrated at glued parts, and the mechanical strength of the piezoelectric element is improved.

In the nineteenth aspect of the optical deflector, the reflecting plane of the mirror and the electrodes of the piezoelectric cantilever may preferably be formed by patterning the same layer of a thin metal film which is directly deposited over the semiconductor substrate and by patterning a thin metal film formed over the piezoelectric film (the twentieth aspect).

In the twentieth aspect of the optical deflector, because the reflecting plane of the mirror and the electrode of the piezoelectric cantilever are formed by patterning the same thin metal films which are directly deposited over the substrate, the structure is simple and can be manufactured with relative ease by a semiconductor planer process.

In another aspect, the present invention provides an optical deflector including a mirror having a reflective plane; a torsion bar extending outwardly from an end of said mirror; a support surrounding said mirror; a first piezoelectric element, one end of said first piezoelectric element being connected to said torsion bar, the other end of the first piezoelectric element being connected to and supported by said support, said first piezoelectric element having at least one piezoelectric cantilever, the cantilever including a supporting body and a piezoelectric body formed on the supporting body to exhibit bending deformation due to piezoelectricity when a driving voltage is applied to the piezoelectric body, said piezoelectric element rotarily driving said mirror through said torsion bar when said driving voltage is applied; and a second piezoelectric element, one end of said second piezoelectric element being connected to said torsion bar, the other end of the second piezoelectric element being connected to and supported by said mirror.

In still another aspect, the present invention provides an optical deflector including: a mirror having a mirror supporting body having a reflective plane thereon; a pair of torsion bars extending outwardly from two opposing sides of said mirror supporting body; a support surrounding said mirror; one or more pairs of first piezoelectric cantilevers disposed across said torsion bars, each of the first piezoelectric cantilevers including a supporting body and a piezoelectric body formed on the supporting body, one end of each of the first piezoelectric cantilevers being connected to said torsion bar at a respective outward end of said torsion bar, the other end of each of the first piezoelectric cantilevers being connected to and supported by said support, each of the piezoelectric cantilevers, upon application of a driving voltage to the corresponding piezoelectric body, exhibiting a bending deformation due to piezoelectricity so as to rotate said torsion bar, thereby rotarily driving said mirror through said torsion bars; and one or more pairs of second piezoelectric cantilevers disposed across said torsion bars, each of the second piezoelectric cantilevers including a supporting body and a piezoelectric body formed on the supporting body, one end of each of the second piezoelectric cantilevers being connected to said torsion bar adjacent said mirror, the other end of each of the second piezoelectric cantilevers being connected to and supported by said mirror supporting body at its periphery, each of the second piezoelectric cantilever including a pair of electrodes sandwiching the corresponding piezoelectric body to output or receive voltages.

According to one or more of these aspects of the present invention, because the optical deflector can be formed integrally using a semiconductor planer process and a MEMS process, the manufacturing of the optical deflector is relatively easy and it is possible to mass-produce the optical deflector with an improved yield. Furthermore, in installing the optical deflector in a device, because it is possible to form the optical deflector integrally with the entire device by the patterning process using a semiconductor planer process and a MEMS process, it is relatively easy to install the optical deflector in other devices, and it is possible to reduce the overall size of the device and to mass-produce it.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 7A and 7B are graphs showing an adjustment of the rotation angle of the mirror in the optical deflector of FIG. 6.

DESCRIPTION OF THE PREFERRED EMBODIMENTS

First Embodiment

With reference to FIGS. 1 through 5, an optical deflector according to a first embodiment of the present invention is described.

Figure 1:
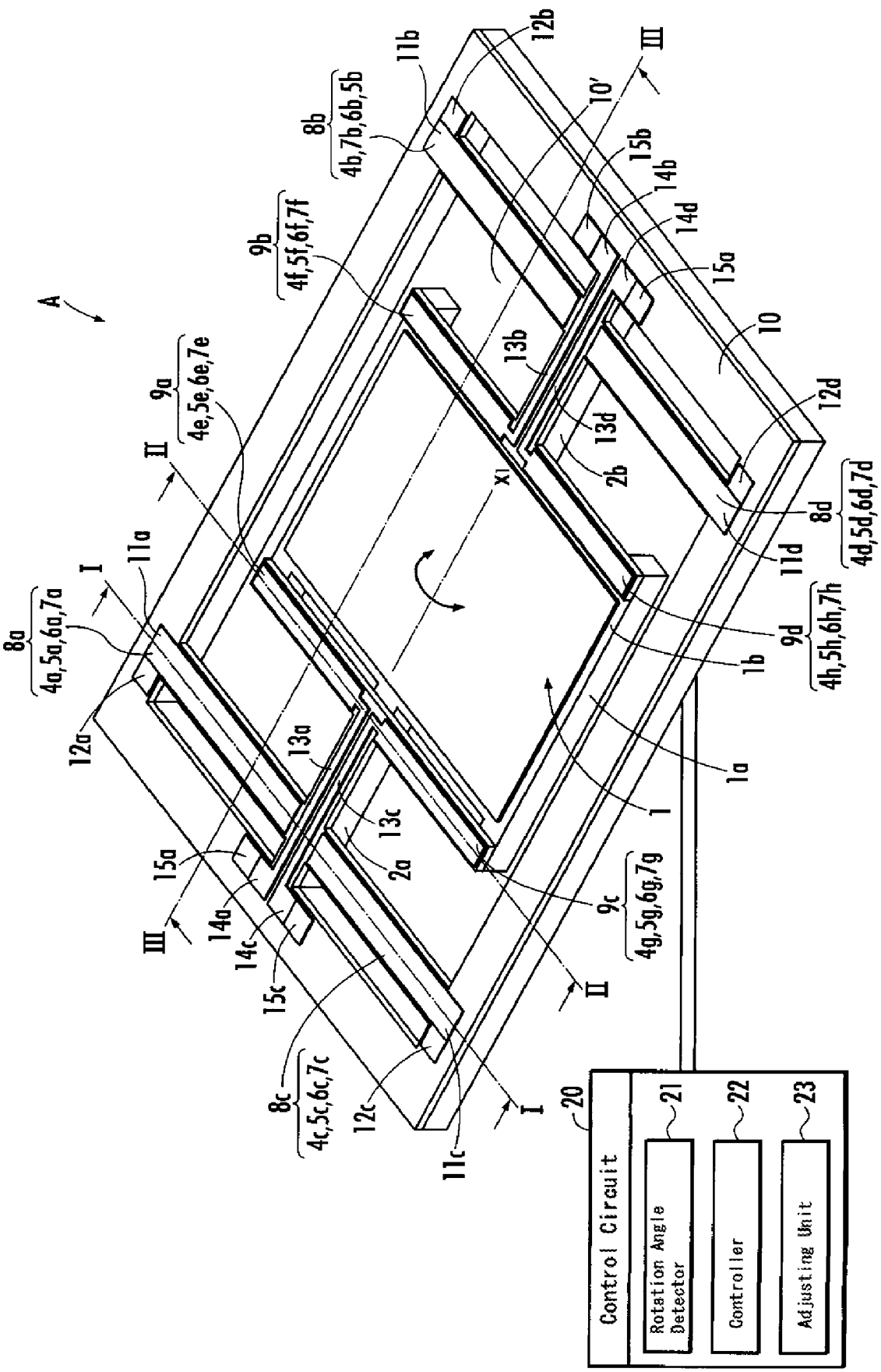
FIG. 1 is a perspective view showing a configuration of an optical deflector according to a first embodiment of the present invention.
Figure 2:
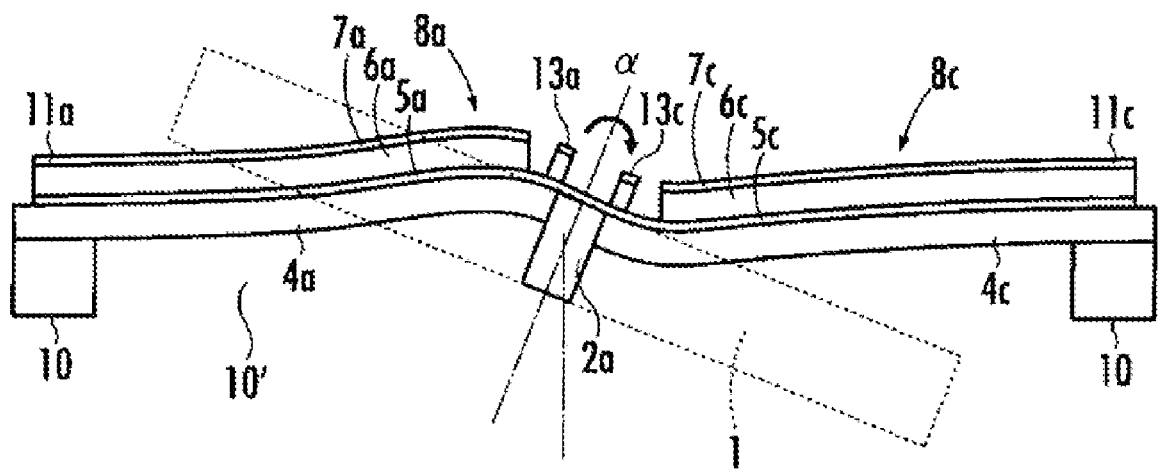
FIG. 2 is a drawing illustrating the actuation of a first piezoelectric element shown in FIG. 1.
Figure 3:
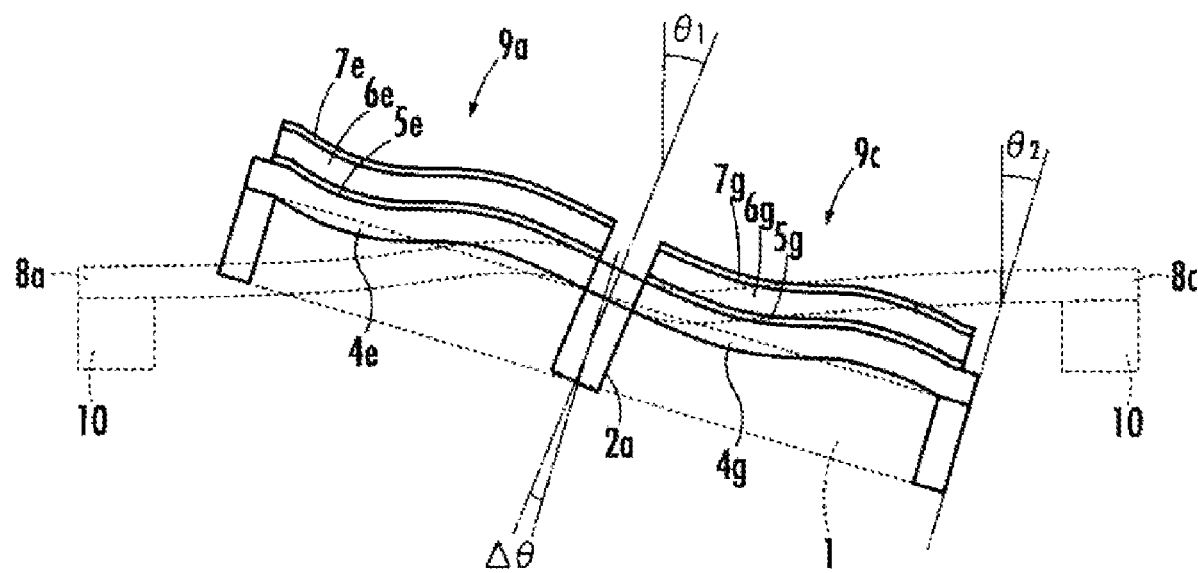
FIG. 3 is a drawing illustrating the deformation of the second piezoelectric element shown in FIG. 1.
Figure 4:
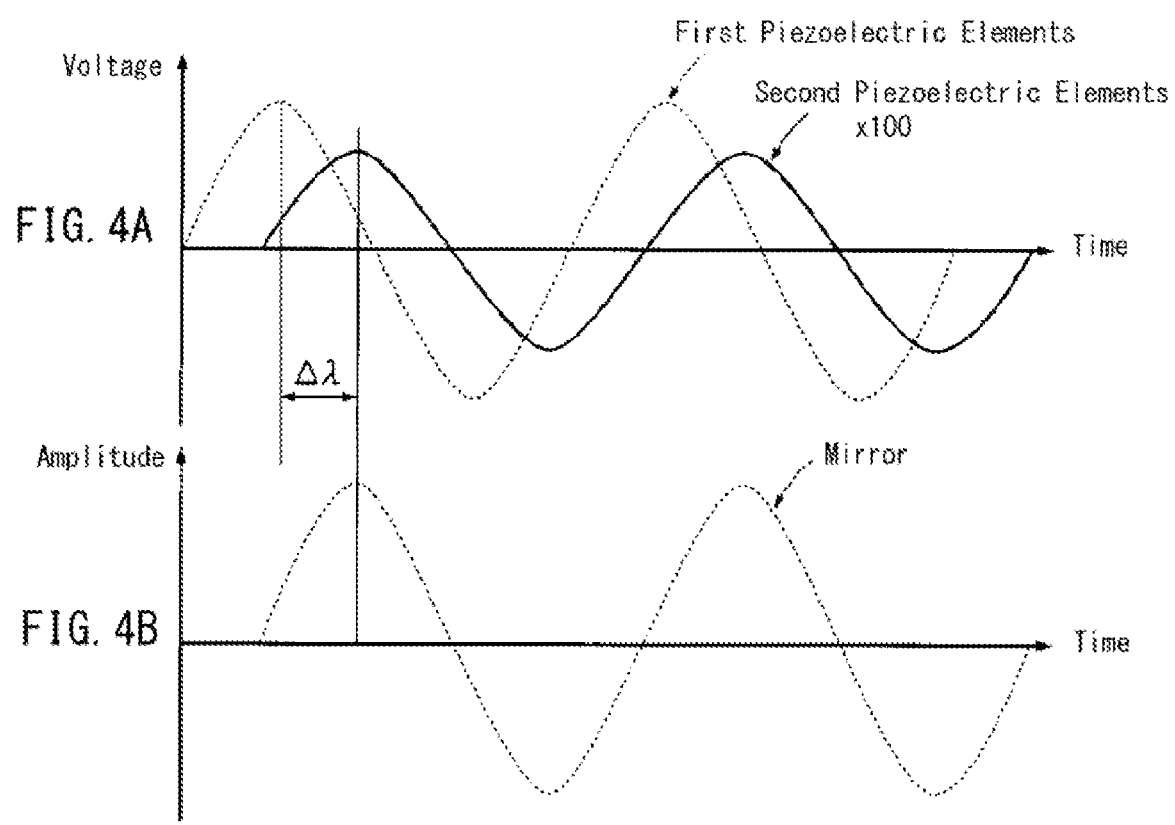
FIGS. 4A and 4B are graphs illustrating a detection of the deflection angle of the mirror of the optical deflector shown in FIG. 1.
Figure 5:
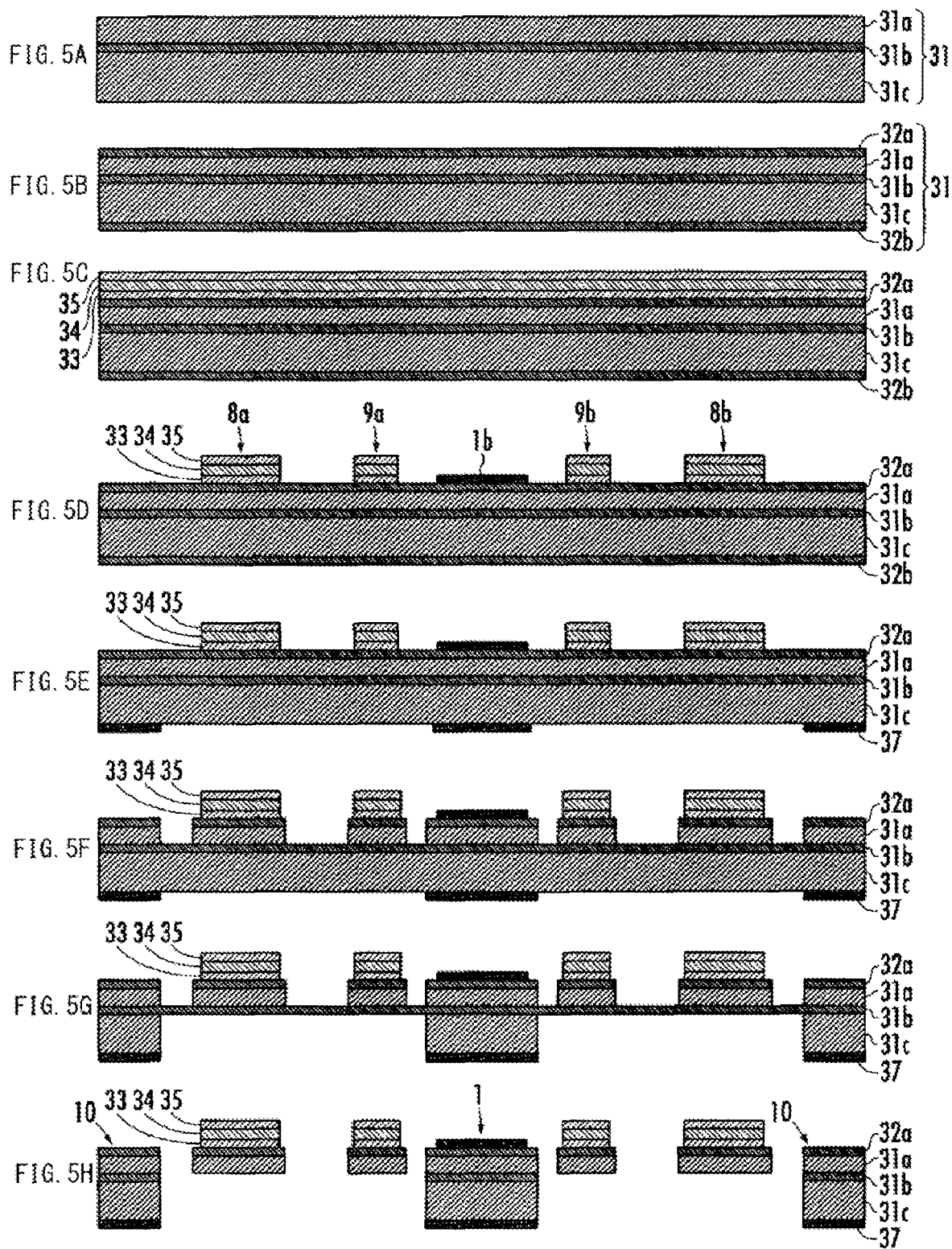
FIGS. 5A to 5H illustrate a manufacturing process of the optical deflector shown in FIG. 1.

FIG. 1 schematically shows a configuration of an optical deflector according to the present embodiment. FIG. 2 is a drawing to explain the operation of the first piezoelectric element of the optical deflector of FIG. 1. FIG. 3 is a drawing to explain the operation of the second piezoelectric element of the optical deflector in FIG. 1. FIGS. 4A and 4B are graphs showing the detection of the rotation angle of the mirror in the optical deflector of FIG. 1. FIGS. 5A-5H illustrate a manufacturing process of the optical deflector of the present embodiment.

As shown in FIG. 1, the optical deflector A of the present embodiment includes a mirror 1, which reflects incoming light, torsion bars 2a, 2b, which are connected to the mirror 1, two pairs of the first piezoelectric elements 8a-8d, which drive the mirror 1 through the torsion bars 2a, 2b, respectively, support 10 which supports the first piezoelectric elements 8a-8d, and two pairs of the second piezoelectric elements 9a-9d to detect the rotation angle of the mirror 1.

The mirror 1 is shaped rectangular. The above-mentioned pair of the torsion bars extend outwardly from the respective center positions of the two opposing sides of the mirror. The torsion bar 2a on one side is connected to the support 10 at its anchor end and is connected to the mirror 1 at its leading end. The torsion bar 2a is connected to the respective leading ends of a pair of the first piezoelectric elements 8a, 8c which are located face to face across the anchor end of the torsion bar. The torsion bar 2a is also connected to the respective leading ends of a pair of the second piezoelectric elements 9a, 9c which are located face to face across the leading end of the torsion bar 2a.

Also, the other torsion bar 2b is connected to the support 10 at its anchor end and is connected to the mirror 1 at its leading end. The torsion bar 2b is connected to the respective leading ends of a pair of the first piezoelectric elements 8b, 8d which are located face to face across the anchor end of the torsion bar. The torsion bar 2b is connected to the respective leading ends of a pair of the second piezoelectric elements 9b, 9d which are located face to face across the leading end of the torsion bar.

The first piezoelectric elements 8a-8d are respectively connected to and supported by the support 10 at their anchor ends. The support 10 is installed so as to surround the mirror 1, the torsion bars 2a, 2b, the first piezoelectric elements 8a-8d, and the second piezoelectric elements 9a-9d. The first piezoelectric elements 8a-8d respectively include a single piezoelectric cantilever in this embodiment. The piezoelectric cantilevers respectively have supporting bodies 4a-4d, bottom electrodes 5a-5d, piezoelectric bodies 6a-6d, and top electrodes 7a-3d.

The second piezoelectric elements 9a-9d are connected to and supported by the mirror 1 at their anchor ends. These second piezoelectric elements 9a-9d respectively include one piezoelectric cantilever. The piezoelectric cantilevers respectively have supporting bodies 4e-4h, the bottom electrodes 5e-5h, piezoelectric bodies 6e-6h, and top electrodes 7e-7h.

The optical deflector A also has top electrode pads 11a-11d and bottom electrode pads 12a-12d, which are used to apply the driving voltages between the top electrodes 7a-7d and the bottom electrodes 5a-5d, respectively, of the first piezoelectric elements 8a-8d. The optical deflector A also has top electrode pads 14a-14d and bottom electrode pads 15a-15d over the support 10, which are used to respectively output piezoelectric electromotive forces that are generated between the top electrodes 7a-7d and the bottom electrodes 5e-5h, respectively, of the second piezoelectric elements 9a-9d.

The bottom electrode pads 12a-12d, 15a-15d and the bottom electrodes 5a-5h are formed by patterning a thin metal film formed over a silicon substrate (in the present embodiment, two layers of thin metal films, which is also referred to as the bottom electrode layer thereafter) using a semiconductor planer process. For the material of these thin metal films, titanium (Ti) is used for the first layer (the bottom layer) and platinum (Pt) is used for the second layer (the top layer), for example. Specifically, the bottom electrodes 5a-5h are formed on the substantially entire top surface of the support bodies 4a-4h. The bottom electrode pads 12a-12d are electrically connected to the bottom electrodes 5a-5d, and the bottom electrode pads 15a-15d are electrically connected to the bottom electrodes 5e-5h through the bottom electrode layer that is disposed over the support 10 and over the torsion bars 2a, 2b.

The piezoelectric bodies 6a-6h are respectively formed separately on the bottom electrodes 5a-5d by patterning a single layer of the piezoelectric film (referred to as the piezoelectric layer hereafter) disposed on the bottom electrode layer using a semiconductor planer process. For the material of the piezoelectric layer, the piezoelectric material of lead zirconate titanate (PZT) is used, for example. Specifically, the piezoelectric bodies 6a-6h are formed on the substantially entire top surfaces of the supporting bodies 4a-4h, respectively.

The top electrode pads 11a-11d, 14a-14d, top electrode wirings 13a-13d, and the top electrodes 7a-7h are formed by patterning a thin metal film disposed on the piezoelectric layer (in the present embodiment, a layer of a thin metal film which is also referred to as the top electrode layer hereafter) using a semiconductor planer process. For the material of the thin metal film, platinum or gold (Au) may be used, for example. Specifically, the top electrodes 7a-7h are formed on the substantially entire the top surfaces of the piezoelectric materials 6a-6h, respectively. The top electrode pads 11a-11d are electrically connected to the top electrodes 7a-7d, respectively. The top electrode pads 14a-14d are electrically connected to the top electrode 7e-7h, respectively, through the top electrode wirings 13a-13d, which are formed over the support 10 and over the torsion bars 2a, 2b, respectively. Here, the top electrode wirings 13a-13d are disposed laterally but separately with respect to one another, and are electrically separated from the bottom electrode pads 12a-12d, 15a-15d, and the bottom electrode 5a-5h by interlayer insulation.

The mirror 1 includes mirror supporting body 1a and a reflecting film having a mirror surface (reflecting surface) 1b formed on the mirror supporting body 1a. The reflecting film 1b having the mirror surface is formed by patterning a thin metal film disposed on the mirror supporting body 1a (in the present embodiment, one layer of a thin metal film, for example) using a semiconductor planer process. For the material of the thin metal film, Au, Pt, silver (Ag), and/or aluminum (Al) may be used, for example.

The mirror support 1a, the torsion bars 2a, 2b, the supporting bodies 4a-4d of the first piezoelectric elements 8a-8d, the support 10, and the supporting bodies 4e-4h of the second piezoelectric elements 9a-9d are integrally formed by patterning a silicon substrate. For the technology of the patterning process, a semiconductor planer process and a MEMS process using photolithography and/or dry etching technique can be used.

A gap 10' is placed between the mirror 1 and the support 10, which enables the mirror 1 to rotate to a certain deflection angle. The mirror 1 is mechanically connected to the first piezoelectric elements 8a-8d through the torsion bars 2a, 2b by integral formation and is driven rotarily in response to the drive of the first piezoelectric elements 8a-8d. The mirror 1 is also mechanically connected to the second piezoelectric elements 9a-9d by integral formation, and the second piezoelectric elements 9a-9d exhibit bending deformations in response to the rotational motion of the mirror 1.

Further, the optical deflector A is connected to control circuit 20 which controls the deflection and sweeping of the mirror 1. The control circuit 20 includes, as its function, controller 22 that controls the phase, frequency, and the deflection angle, etc., of the deflection and sweeping/scanning operation of the mirror 1 by controlling the phase, the frequency, the amplitude, and the waveform, etc. of the driving voltages for the first piezoelectric elements 8a-8d. The control circuit 20 also has, as its function, the rotation angle detector 21 that detects the rotation angle based on the piezoelectric electromotive forces generated at the second piezoelectric elements 9a-9d. The controller 22 performs feedback control of the first piezoelectric elements 8a-8d based on the rotation angle detected by the rotation angle detector 21. Adjusting unit 23 shown in FIG. 1 will be explained later with reference to the second embodiment.

Next, the operation of the optical deflector A of the present embodiment is explained. First, in the optical deflector A, a driving voltage is applied by controller 22 to two pairs of the first piezoelectric elements 8a-8d. As a result, the two pairs of the first piezoelectric elements 8a-8d are driven to generate the angular displacements at their respective leading ends. Due to these angular displacements, the mirror 1 rotates around the axis x1 that is coaxial to the axes of the torsion bars 2a, 2b.

FIG. 2 is a drawing which shows the drive status of the first piezoelectric elements 8a-8d of the optical deflector A of the present embodiment when the mirror 1 is rotarily driven. FIG. 2 schematically illustrates a cross-sectional view taken along the line I-I of FIG. 1, as seen from the direction of the arrow shown in the figure. As shown in FIG. 2, a pair of the first piezoelectric elements 8a, 8c exhibit bending deformations in opposite directions with respect to one another, when reverse polarity voltages ±V1 are applied between the top electrodes 7a, 7c, and the bottom electrodes 5a, 5c, respectively, of the first piezoelectric elements 8a, 8c.

As shown in FIG. 2, due to these bending deformations, the leading ends of the first piezoelectric elements 8a, 8c are driven rotary upward and downward, respectively, along the thickness direction of the support 10 (the substrate), because the anchor ends of the first piezoelectric elements 8a, 8c are connected to and supported by the support 10. Because the reverse polarity voltages ±V1 with respect to one another are applied to the first piezoelectric elements 8a, 8c, respectively, the respective leading ends of the first piezoelectric elements 8a, 8c move in the opposite directions. Thus, a torsional displacement is generated in the torsion bar 2a, and a rotary torque centered at the torsion bar 2a acts on the mirror 1.

Likewise, by applying the reverse polarity voltages ±V1 with respect to one another to the other pair of the first piezoelectric elements 8b, 8d, a torsional displacement is generated in the torsion bar 2b in the same direction, and a rotary torque centered at the torsion bar 2b acts on the mirror 1.

Therefore, by appropriately driving the first piezoelectric elements 8a-8d, a rotary torque α centered at the torsion bars 2a, 2b acts on the mirror 1. Therefore, the mirror 1 rotates as shown by the arrows in FIG. 1 around the single axis x1 centered at the torsion bars 2a, 2b.

Here, to the first piezoelectric elements 8a, 8b on the one side of the pairs, first alternating current voltages having the same phase with respect to each other are respectively applied. To the first piezoelectric elements 8c, 8d on the other side of the pairs, second alternating current voltages having the same phase with respect to each other are applied. Here, the first alternating current voltage and the second alternating current voltage are alternating current voltages (e.g., a sine wave) with the reverse phase with respect to each other or with a phase offset with respect to one another. By rotating the mirror 1 this way, the light sweeping/scanning operation can be performed at a desired frequency with a desired (maximum) deflection/sweeping angle. Here, if the first piezoelectric elements 8a-8d are resonant driven at a frequency near the mechanical resonant frequency (the primary resonant point) of the mirror 1 including the torsion bars 2a, 2b, the light sweeping/scanning can be performed at a larger deflection/sweeping angle. Here, the first piezoelectric elements 8a-8d may be non-resonant driven instead, and the applied driving voltage may be a direct current voltage.

At the same time, in this example of the optical deflector A, the rotation angle detector 21 detects the piezoelectric electromotive forces which are generated in the second piezoelectric elements 9a-9d, and determines the rotation angle of the mirror 1 based on the detected piezoelectric electromotive forces.

FIG. 3 is a drawing which shows the drive status of the second piezoelectric elements 9a-9d of the optical deflector A of the present embodiment when the mirror 1 is rotarily driven. FIG. 3 schematically shows a cross-sectional view taken along the line II-II, as seen in the direction of the arrow shown in FIG. 1. In addition, in FIG. 3, the first piezoelectric elements 8a, 8c in FIG. 1 are drawn in broken lines. As shown in FIG. 3, when the torsion bar 2a is rotated at the rotation angle θ1 by driving the first piezoelectric elements 8a, 8c, due to the moment of inertia, the mirror 1 rotates at the rotation angle θ2 which differs from θ2. As a result, a pair of the second piezoelectric elements 9a, 9c respectively exhibit bending deformations in the reverse directions with respect to each another. In other words, when the mirror 1 oscillates, due to the moment of inertia of the mirror 1, the angle difference Δθ is generated between the twist angle θ1 of the torsion bar 2a and the deflection angle θ2 of the mirror 1. Because the second piezoelectric elements 9a, 9c are fixed to the mirror 1 at one ends and to the torsion bar 2a at the other ends, stresses are generated in the second piezoelectric elements 9a, 9c, respectively, due to Δθ, causing respective deformations on the second piezoelectric elements 9a, 9c, as shown in the FIG. 3. Piezoelectric bodies 6e, 6g, which are installed on the piezoelectric elements 9a, 9c, respectively, generate polarizations due to the stresses, and generate voltages between the respective top and bottom electrodes. The piezoelectric electromotive forces thus generated by these bending deformations are outputted to the rotation angle detector 21. Similarly, when the torsion bar 2b rotates at the rotation angle θ1, the mirror 1 rotates at the rotation angle θ2, causing bending deformations on the second piezoelectric elements 9b, 9d in the reverse directions with respect to one another. As a result, the piezoelectric electromotive forces corresponding to the bending deformations are generated, and the rotation angle of the mirror 1 is detected based on the piezoelectric electromotive forces.

FIG. 4A shows the driving voltage of the first piezoelectric elements 8a-8d, and the output voltage of the second piezoelectric elements 9a-9d. In FIG. 4A, the axis of abscissa shows the time, and the axis of ordinate shows the voltage. The output voltage of the piezoelectric elements 9a-9d is multiplied by a factor of 100. Compared to the driving voltage of the piezoelectric elements 8a-8d, the output voltage of the second piezoelectric elements 9a-9d has a waveform which is delayed by Δλ in time. In this case, the amplitude of the mirror 1 is shown in FIG. 4B. In FIG. 4B, the axis of abscissas shows the time, and the axis of ordinate shows the amplitude. As shown in the figure, because the variation of the output voltage of the second piezoelectric elements 9a-9d is substantially in synchronization with the variation of the amplitude of the mirror 1, the rotation angle of the mirror 1 can be detected substantially in real time by using the piezoelectric electromotive forces (the output voltage) generated at the second piezoelectric elements 9a-9d. By using feedback control of the driving voltages of the first piezoelectric elements 8a-8d by the controller 22 based on the detected rotation angle, the deflection and sweeping/scanning performance can be improved.

Accordingly, in the optical deflector A of the present embodiment, by having the second piezoelectric elements 9a-9d, the drive status of the mirror 1 can be detected substantially in real time with high accuracy. Further, using feedback control based on the detected drive status, the deflection and sweeping/scanning performance can be improved.

Manufacturing Process

FIGS. 5A-5H show a manufacturing process of the optical deflector A of the present embodiment. FIGS. 5A-5H schematically show cross sections of the optical deflector A.

As shown in FIG. 5A, an SOI substrate 31 is used as the substrate to form the mirror support 1a, the torsion bar 2a, 2b, the supporting bodies 4a-4h, and the support 10. The SOI substrate 31 is a laminated substrate made of three layers of: single crystal silicon (active layer 31a; also referred to as the SOI layer), silicon oxide (interlayer oxide film layer 31b), and single crystal silicon (handling layer 31c). The thicknesses of individual layers of the SOI substrate are: for example, the active layer 31a: 5-100 µm; the interlayer oxide film 31b: 0.5-2 µm; and the handling layer 31c: 100-600 µm. The top surface of the active layer 31a is treated with an optical polishing process.

As shown in FIG. 5B, thermally-oxidized films 32a, 32b are formed by oxidizing the top surface (on the side of the active layer 31a) and the bottom surface (on the side of the handling layer 31c) of the SOI substrate 31 in a thermal oxidation furnace (a diffusion furnace) (thermally oxidized film forming step). The thicknesses of the thermally oxidized silicon films 32a, 32b is set to 0.1-1 µm, for example.

Next, as shown in FIG. 5C, bottom electrode layer 33, piezoelectric layer 34, and top electrode layer 35 are formed in series on the top surface of the SOI substrate 31 (on the side of the active layer 31a). First, the bottom electrode layer 33 which is made of two layers of thin metal films is formed on the top surface of the thermally oxidized film 32a on the side of the active layer 31a of the SOI substrate 31. For the material of the bottom electrode layer 33, Ti is used for the first thin metal film layer (the bottom layer) and Pt is used for the second thin metal film layer (the top layer), for example. Each thin metal film is formed by sputtering or an electron beam evaporation technique, etc. The thicknesses of those thin metal films are: for example, about 30-100 µm for Ti in the first layer, and about 100-300 µm for Pt in the second layer.

Next, piezoelectric layer 34, which is, for example, made of a single film of piezoelectric substance, is formed on the bottom electrode layer 33. For the material of the piezoelectric layer 34, the piezoelectric material of lead zirconate titanate (PZT) may be used. The thickness of the piezoelectric film is about 1-10 µm, for example. The piezoelectric film is formed by, for example, an ion plating technique using a reactive arc discharge. Specifically, as the ion plating technique using the reactive arc discharge, a technique that is described in the following Japanese patent application documents by the present applicants may be used, for example: Laid-open No. 2001-234331, Laid-open No. 2002-177765, and Laid-open No. 2003-81694, all of which are hereby incorporated by reference in their entireties.

In the ion plating technique using the reactive arc discharge, a metal material is thermally evaporated in a high density oxygen plasma which is generated by a plasma gun in a vacuum chamber, and the resultant metal vapor reacts with oxygen over a semiconductor substrate or in the vacuum chamber to form a piezoelectric film over the semiconductor substrate. By using this technique, the piezoelectric film is formed at a high rate even at a relatively low film forming temperature. Notably, in the ion plating technique using the reactive arc discharge, a piezoelectric film with high quality piezoelectric properties can be formed using a seed layer formed by the CSD (chemical solution deposition) technique as the base layer.

Alternatively, the piezoelectric film can also be formed by sputtering, or a sol-gel technique, etc. However, a relatively thick piezoelectric film with good piezoelectric properties (as good as a bulk piezoelectric material) can be formed by the ion plating technique using the reactive arc discharge.

Next, a top electrode layer is formed as follows. Top electrode layer 35, which is made of a single layer of thin metal film, is formed on the piezoelectric layer 34. For the material of the top electrode layer 35, Pt or Au may be used. The top electrode layer 35 is formed by sputtering or an electron beam evaporation technique, etc. The thickness of the top electrode layer 35 is, for example, about 10-200 µm.

Next, as shown in FIG. 5D, the top electrode layer 35, the piezoelectric layer 34, and the bottom electrode layer 33 are patterned to form top electrodes 7a-7h, piezoelectric bodies 6a-6h, and bottom electrodes 5a-5h of the first piezoelectric elements 8a-8d and of the second piezoelectric elements 9a-9d.

More specifically, a resist material is patterned on the top electrode layer 35 by photolithography. Next, using the patterned resist as a mask, dry etching is performed on the top electrode layer 35 and the piezoelectric layer 34 by an RIE (Reactive ion Etching) device. In this process, the top electrode pads 11a-11d, 14a-14d, the top electrodes 7a-7h, and the piezoelectric bodies 6a-6h are formed. At the same time, the top electrode wirings 13a-13d (the electrode wiring pattern) which electrically connect the electrode pads of these top electrodes to the top electrodes of the corresponding piezoelectric cantilevers are also formed.

Then a resist material is patterned on the bottom electrode layer 33 by photolithography. Using the patterned resist as a mask, dry etching is performed on the bottom electrode layer 33 by an RIE device to form the bottom electrode pads 12a-12d, 15a-15d and the bottom electrodes 5a-5h.

In this process, as shown in FIG. 5D, using this shape forming process of the bottom electrode layer as the step for forming a reflective plane, a mirror reflective film 1b of the mirror 1 is formed by leaving the bottom electrode layer at a position corresponding to the mirror 1 by protecting against the dry etching with a mask formed by the resist material.

If a better light reflectivity is desired for the mirror 1, the reflective film 1b may be formed after this shape forming step. In this case, a layer of thin metal film (a reflective film) is formed on the entire surface of the SOI substrate 31 on the side of the active layer 31a. For the material of the reflective film, Au, Pt, Al, etc. may be used, for example. The reflective film may be formed by sputtering or an evaporation technique, for example. The thickness of the reflective film is about 100-500 µm, for example. Then, the reflective film is patterned. More specifically, a resist material is patterned on the reflective film by photolithography. Using the patterned resist material as a mask, dry etching is performed on the reflective film by an RIE device to form the mirror reflective film 1b on the thermally oxidized silicon film 32 on the side of the active layer 31a of the SOI substrate 31.

Next, as shown in FIGS. 5E-5H, the mirror support 1a, the torsion bars 2a, 2b, the supporting bodies 4a-4h of the piezoelectric cantilevers of the first and second piezoelectric elements 8a-8d, 9a-9d, and the support 10 are formed.

First, as shown in FIG. 5E, a hard mask is formed after removing the thermally oxidized film 32b. Specifically, thermally oxidized silicon film 32b on the bottom side of the handling layer 31c of the SOI substrate is removed using buffered hydrofluoric acid (BHF) after protecting the entire top surface of the SOI substrate with a thick film of a resist material. Then a layer of thin Al film 37 is formed on the entire bottom surface of the exposed handling layer 31c. The thin Al film is formed by sputtering or a vaporization technique, for example. A resist is then patterned on the the thin Al film by photolithography. Next, wet etching is performed on the thin Al film 37 using the patterned resist as a mask to form a hard mask, which will be used in dry etching by an ICP (Inductively Coupled Plasma)-RIE device, which will be described with reference to FIG. 5G below.

Next, as shown in FIG. 5F, the active layer 31a (the single crystal silicon) is patterned. First, a resist is patterned by photolithography. Using the patterned resist material as a mask, the thermally oxidized film 32a and the silicon in the active layer 31a are patterned by an ICP-RIE device. The ICP-RIE device is a dry etching device used in a micro machining technique and can scrape out silicon vertically and deeply.

Next, as shown in FIG. 5G, the handling layer 31c is patterned. The silicon in the handling layer 31c is patterned using the hard mask, which was made in the process of FIG. 5E, as a mask by an ICP-RIE device. In this process, the silicon is removed deeply in the back sides of the torsion bar 2a, 2b, and the supporting bodies 4a-4h.

Next, as shown in FIG. 5H, the interlayer oxide film 31b of the SOI substrate 31 is removed by wet etching using buffered hydrofluoric acid (BHF). In this process, the areas surrounding the mirror 1, the torsion bar 2a, 2b, the first piezoelectric elements 8a-8d, and the second piezoelectric elements 9a-9d, are partially disconnected from the SOI substrate 31 to create gaps so that the rotary drive of the mirror 1 and the torsion bars 2a, 2b, the drives of the first piezoelectric elements 8a-8d and the deformations of the second piezoelectric elements 9a-9d are made possible.

Through the above-mentioned process, a mechanical part of an optical deflector is manufactured. A plurality of such devices may be manufactured from a single wafer at the same time, and individual devices are separated into chips by a dicing process. The resulting chips may be installed in TO (Transistor Outline) type CAN packages by die bonding and wire bonding, for example.

As shown above, because the optical deflector A can be formed integrally using a semiconductor planer process and a MEMS process, the manufacturing of the optical deflector is relatively easy and it becomes possible to miniaturize and/or mass-produce the optical deflector with an improved yield. In addition, the second piezoelectric elements 9a-9d can be formed in the process of forming the first piezoelectric elements 8a-8d, which can be done without additional processes and without additional complexity. Furthermore, in building the optical deflector in a device, because it is possible to form the optical deflector integrally within other device by forming a whole device integrally using a semiconductor planer process and a MEMS process, it is relatively easy to build the optical deflector in other devices A working example of the first embodiment was manufactured and tested. The aforementioned optical deflector was designed to have a resonant frequency of 5 kHz, and was manufactured in the aforementioned manufacturing process. The thicknesses of respective layers of the SOI substrate were: the active layer at 50 μm, the interlayer oxide film layer at 2 μm, the handling layer at 525 μm, and the thermally oxidized silicon film at 50 nm. The bottom electrode layer (Ti/Pt) was made of 50 nm of the Ti layer and 150 nm of the Pt layer. The thickness of the piezoelectric layer was 3 μm and the thickness of the top electrode layer (Pt) was 150 nm.

To this optical deflector, an alternating current voltage with a peak-to-peak voltage $V_{pp}$ of 20 V at a frequency of 5 kHz was applied to the first piezoelectric elements 8a-8d as the driving signal. As output signals from the second piezoelectric elements 9a-9d, the rotation angle detector 21 obtained angle displacement signals that had some amount of phase delay as compared with the drive signal for the first piezoelectric elements 8a-8d. Based on the angular displacement signal, the rotation angle detector 21 detected the maximum deflection angles (the swing angles) of the optical deflector as ±5°. Furthermore, during the rotary drive with the maximum deflection angles at ±5°, it was detected that the deflection angle of the optical deflector had a fluctuation in a range of ±0.05°. Furthermore, when the temperature of the external environment changed and the mechanical resonant frequency changed with some deviation from that of the initial operation, it was detected that the deflection angle of the optical deflector had a fluctuation in a range of ±2° during the rotary drive with the maximum deflection angles at ±5°. Against these variations (fluctuations) of the deflection angle, by performing feedback control of the amplitude, phase, and the frequency of the drive signal of the first piezoelectric elements 8a-8d by the controller 22 based on the detected rotation angle of the mirror 1, the variations of the deflection angle were absorbed, and stable oscillation of the mirror 1 with a constant maximum deflection angle was achieved.

Another test was performed on a plurality of optical deflectors A made in accordance with the first embodiment. The plurality of the optical deflectors tested here were all designed to have the same resonant frequency of 5 kHz as in the above cases.

On each of the optical deflectors, the actual resonant frequency was measured. The resonant frequencies were distributed in a range from 4.997 kHz to 5.003 kHz. Here, with respect to the optical deflectors that had the resonant frequencies of 4.997 kHz and 5.003 kHz, respectively, when an alternating current voltage with a peak-to-peak voltage $V_{pp}$ of 20 V at a frequency of 5 kHz was applied to the respective first piezoelectric elements 8a-8d, the rotation angle detector 21 detected the maximum deflection angle of ±4° in both cases. By performing feedback control of the amplitude, the phase, and the frequency of the drive signal of the first piezoelectric elements 8a-8d by the controller 22 based on the detected rotation angle of the mirror 1, however, it was possible to adjust the maximum deflection angle of all of the optical deflectors to 5 kHz with high precision.

Still another test was performed on a working example of the first embodiment of the present invention. As in the cases above, an optical deflector that was designed to have a resonant frequency of 5 kHz was manufactured in the same way as in the above examples. When an alternating current voltage with a peak-to-peak voltage $V_{pp}$ of 20 V at a frequency of 5 kHz was applied to the first piezoelectric elements 8a-8d as the driving signal, the rotation angle detector 21 detected the maximum deflection angle as ±5° based on detected rotation angle of the mirror 1. Then an external vibration having a frequency of 5 kHz and an acceleration of 500 G was applied to the optical deflector while it was in the normal operation. In this case, by performing feedback control of the amplitude, the phase, and the frequency of the driving signal of the first piezoelectric elements 8a-8d by the controller 22 based on the detected rotation angle, a momentary or impulsive increase (an abnormal amplitude increase) of the rotation angle of the mirror 1 due to the external vibrations was effectively suppressed.

Second Embodiment

Figure 6:
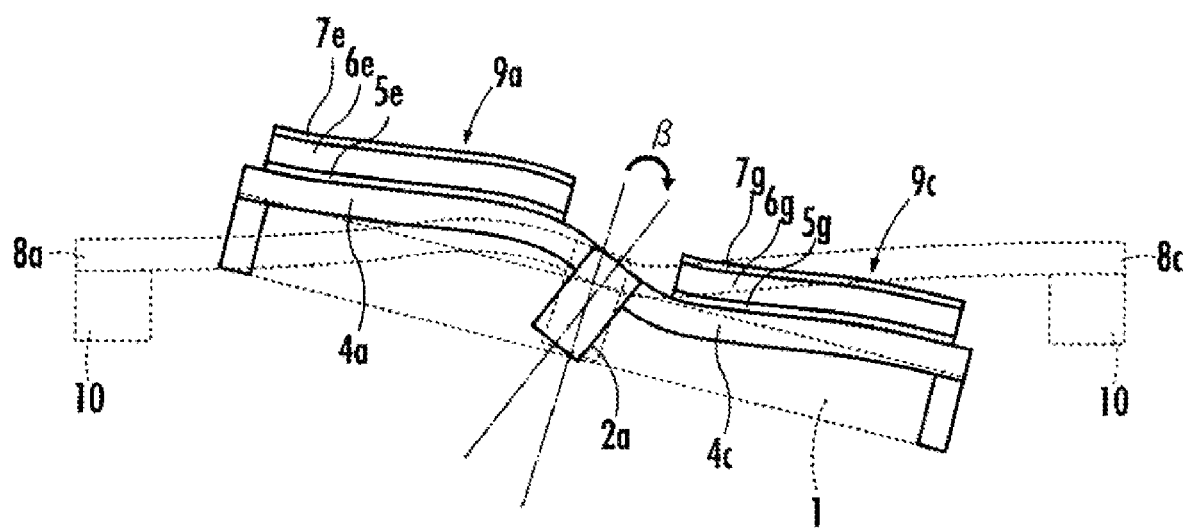
FIG. 6 is a drawing to explain the actuation of the second piezoelectric element.

With reference to FIGS. 6 and 7A-&B, an optical deflector according to a second embodiment of the present invention is described. FIG. 6 is a drawing to explain the operation of the second piezoelectric elements of the optical deflector of the second embodiment of the present invention. FIGS. 7A, 7B are graphs showing an adjustment of the rotation angle of the mirror in the optical deflector of FIG. 6. The structure of optical deflector A' of the present embodiment may have the same configuration as the optical deflector of the first embodiment, but the operation is different. Alternatively, the present embodiment may have a structure different from the first embodiment to be more suited for the adjustment operation which will be described below.

In the optical deflector of the present embodiment, the second piezoelectric elements 9a-9d are used to assist and adjust the rotation of the mirror 1 caused by driving the first piezoelectric elements 8a-8d. The control circuit 20, which is connected to the optical deflector A', has, as its function, an adjusting unit 23 which adjusts the rotary drive of the mirror 1 caused by the drive of the first piezoelectric elements 8a-8d by applying appropriate driving voltages to the second piezoelectric elements 9a-9d. In the present embodiment, the control circuit 20 does not have the rotation angle detector 21, and detector 21 is disabled. Alternatively, detector 21 may be temporarily disabled when the deflector operates in a mode described with reference to the second embodiment. The detector 21 may be reactivated when the deflector is operated in a mode that is the same as or similar to the operation of the first embodiment described above.

The control circuit 20 has the controller 21 and the adjusting unit 22. The controller 21 controls the phase, the frequency, and the deflection angle, etc., of the rotary drive of the mirror 1 by controlling the phase, the frequency, the amplitude, and the waveform, etc. of the driving voltages applied to the first piezoelectric elements 8a-8d. The adjusting unit 22 adjusts the rotary drive of the mirror 1 caused by the first piezoelectric elements 8a-8d by controlling the phase, the frequency, the amplitude, and the waveform, etc. of the driving voltages applied to the second piezoelectric elements 9a-9d.

Next, the operation of the optical deflector A' of the present embodiment is explained. First, in the same way as in the first embodiment, the controller 22 applies voltages to two pairs of the first piezoelectric elements 8a-8d to drive the two pairs of the first piezoelectric elements 8a-8d, thereby generating angular displacements of their respective leading ends. Due to these angular displacements, the twist displacements are generated in the torsion bars 2a, 2b, and a rotary torque α centered at the torsion bars 2a, 2b acts on the mirror 1.

At the same time, in the optical deflector A' of the present embodiment, the adjusting unit 23 applies driving voltages to the second piezoelectric elements 9a-9d.

FIG. 6 is a drawing which shows the drive status of the second piezoelectric elements 9a-9d of the optical deflector A' of the present embodiment when the mirror 1 is rotary driven. FIG. 6 shows a cross-sectional view taken along the line II-II of FIG. 1 as seen from the direction indicated in the arrow. In addition, in FIG. 6, the first piezoelectric elements 8a, 8c in FIG. 1 are drawn in broken lines. As shown in FIG. 6, when the second piezoelectric elements are driven by applying the reverse polarity voltages ±V2 with respect to one another between the top electrodes 7e, 7g and the bottom electrodes 5e, 5g, respectively, of the piezoelectric cantilevers of a pair of the second piezoelectric elements 9a, 9c, the second piezoelectric elements exhibit bending deformations in the reverse directions with respect to one another.

As shown in FIG. 6, due to these bending deformations, the leading ends of the second piezoelectric elements 9a, 9c are driven rotarily upward and downward, respectively, along the thickness direction of the mirror 1, because the anchor ends of the second piezoelectric elements 9a, 9c are connected to and supported by the mirror 1. Because the reverse polarity voltages ±V2 with respect to one another are applied to the second piezoelectric elements 9a, 9c, the leading ends of the second piezoelectric elements 9a, 9c move in the opposite directions, respectively. As a result, torsional displacements are generated in the torsion bar 2a, and a rotary torque centered at the torsion bar 2a acts on the mirror 1.

Likewise, by applying the reverse polarity voltages ±V2 with respect to one another to the other pair of the first piezoelectric elements 9b, 9d, the torsional displacements are generated in the torsion bar 2b in the same direction, and a rotary torque centered at the torsion bar 2b acts on the mirror 1.

Therefore, due to the angular displacements generated by the second piezoelectric elements 9a-9d, the twist displacements are generated in torsion bars 2a, 2b, and a rotary torque β centered at the torsion bars 2a, 2b acts on the mirror 1.

Therefore, the mirror 1 rotates around the single axis x1 centered at the torsion bars 2a, 2b in response to the twist displacements (the rotations) of the torsion bars 2a, 2b by driving the first and second piezoelectric elements 8a-8d, 9a-9d. Here, because the second piezoelectric elements 9a, 9c are connected to the mirror 1 and are not connected to the support 10, the rotary torque β can be generated additionally without decreasing the rotary torque α generated by the first piezoelectric elements 8a, 8c.

Therefore, the total rotary torques applied to the torsion bars 2a, 2b are the sum of the rotary torques generated by the first piezoelectric elements 8a-8d and the second piezoelectric elements: α+β. As a result, the maximum deflection angle of the mirror 1 can be increased. Further, the first piezoelectric elements 8a-8d and the second piezoelectric elements 9a-9d can be controlled independently and separately by applying appropriate driving voltages separately. Therefore, the rotary torque α+β can be set at a desired value. Therefore, the rotary drive of the mirror 1 can be adjusted so that parameters of the rotary drive of the mirror 1 and/or parameters of the rotary drive of the torsion bars 2a, 2b are set to desired values or set to be within desired ranges.

Here, in the drive of the first piezoelectric elements 8a-8d, the resonant drive of the mirror 1 by this drive delays by Δλ in phase due to the moment of inertia. Therefore, the frequency of the driving signal of the second piezoelectric elements 9a-9d can be set at the same as the resonant frequency of the mirror driven by the first piezoelectric elements 8a-8d. In doing this, by suppressing a destructive interference between the rotary torques α, β, which are generated individually, the maximum deflection angle can be increased. Further, by adjusting the phase and the frequency of the driving signal for the second piezoelectric elements 9a-9d, parameters of the rotary drive of the mirror 1 can be adjusted, as desired.

FIG. 7A shows a driving voltage for the first piezoelectric elements 8a-8d and a driving voltage for the second piezoelectric elements 9a-9d. In FIG. 7A, the axis of abscissas is the time, and the axis of ordinate is the voltage. Compared to the driving voltage applied to the first piezoelectric elements 8a-8d, the driving voltage applied to the second piezoelectric elements 9a-9d has a waveform delayed by Δλ in phase. In this case, the amplitude of the mirror 1 is shown in FIG. 7B. In FIG. 7B, the axis of abscissas is the time, and the axis of ordinate is the amplitude. As shown in the figure, by adding the rotary drive by the second piezoelectric elements 9a-9d to the rotary drive by the first piezoelectric elements 8a-8d, the amplitude (the maximum deflection angle) of the mirror 1 can be increased.

Therefore, in the optical deflector A' of the present embodiment, by having the second piezoelectric elements 9a-9d, the drive status of the mirror 1 can be controlled in a speedy manner with high precision. Thus, the maximum deflection angle can be increased, and the deflection angle and the deflection velocity can be controlled rapidly with high precision, thereby improving the deflection and sweeping/scanning performances.

In this embodiment, to the first piezoelectric elements 8a, 8b on one side of the pairs, first alternating current voltages having the same phase with respect to each other are applied. To the first piezoelectric elements 8c, 8d on the other side of the pairs, second alternating current voltages having the same phase with respect to each other are applied. To the second piezoelectric elements 9a, 9b on the one side of the pairs, the third alternating current voltages having the same phase with respect to each other are applied. To the second piezoelectric elements 9c, 9d on the other side of the pairs, fourth alternating current voltages having the same phase with respect to each other are applied. Here, the first alternating current voltages and the second alternating current voltages are alternating current voltages (e.g., a sine wave) having reverse phases or with a phase offset with respect to one another. Likewise, the third alternating current voltage and the fourth alternating current voltage are alternating current voltages (e.g., a sine wave) with reverse phases or with a phase offset with respect to one another. By rotating the mirror 1 in this way, the light sweeping operation can be performed in one direction at a desired frequency with a desired deflection angle. Here by resonantly oscillating the mirror 1 at a frequency near the mechanical resonant frequency (the primary resonant point) of the mirror 1 including the torsion bars 2a, 2b by driving the first and second piezoelectric elements 8a-8d, 9a-9d, the light sweeping/scanning operation can be performed at a larger deflection angle. The first and second piezoelectric elements 8a-8d, 9a-9d can be driven in a non-resonant manner, and the applied voltages can be direct current voltages instead.

A working example of the second embodiment was manufactured and tested. An optical deflector was designed to have a resonant frequency of 5 kHz, and was manufactured in the aforementioned manufacturing process. Here, the thicknesses of the respective layers in the SOI substrate were: the active layer at 50 μm, the interlayer oxide film layer at 2 μm, the handling layer at 525 μm, and the thermally oxidized silicon film at 500 nm. The thickness of the bottom electrode layer (Ti/Pt) was as follows: 50 nm for the Ti layer, and 150 nm for the Pt layer. The thickness of the piezoelectric layer was 3 μm and the thickness of the top electrode layer (Pt) was 150 nm.

When an alternating current voltage with a peak-to-peak voltage $V_{pp}$ of 20 V at a frequency of 5 kHz was applied to the first piezoelectric elements 8a-8d of this optical deflector as the driving signal, the maximum deflection angles of ±5° were obtained. Then, in addition to the first driving signal, an alternating current voltage with a peak-to-peak voltage $V_{pp}$ of 20 V at a frequency of 5 kHz with a phase delay $\Delta\lambda=\pi/4$ relative to the first driving signal was applied to second piezoelectric elements 9a-9d. As a result, the maximum deflection angle of ±8° was obtained, increasing the maximum deflection angle by a factor of 1.6.

Another test was performed on a plurality of working examples of the second embodiments. Multiple optical deflectors were manufactured to have a resonant frequency of 5 kHz as in the above case.

For each of these optical deflectors, the resonant frequency was measured. The measured resonant frequencies were distributed in the range between 4.997 kHz and 5.003 kHz. With respect to the optical deflector that had a resonant frequency of 5 kHz, an alternating current voltage with a peak-to-peak voltage $V_{pp}$ of 20 V at a frequency at 5 kHz was applied as a driving signal to the first piezoelectric elements 8a-8d. As a result, the maximum deflection angle of ±5° was obtained. On the other hand, in the optical deflectors that had the resonant frequencies of at 4.997 kHz and 5.003 kHz, respectively, an alternating current voltage with a peak-to-peak voltage $V_{pp}$ of 20 V at a frequency of 5 kHz was applied as the driving signal to the respective first piezoelectric elements 8a-8d. As a result, the maximum deflection angles of the optical deflector were reduced to ±4° in both cases. This reduction was due to the difference between the driving frequency of the first piezoelectric elements 8a-8d and the resonant frequencies of the mirror 1.

For the optical deflectors that had the resonant frequencies of 4.997 kHz and 5.003 kHz, respectively, in addition to the first driving signal, an alternating current voltage with a peak-to-peak voltage $V_{pp}$ of 20 V at a frequency of 5 kHz with a phase delay $\Delta\lambda=\pi/4$ relative to the first driving signal was applied to the second piezoelectric elements 9a-9d. As a result, the maximum deflection angle of 5° was obtained.

Still another test was performed on a working example of the second embodiment. As in the cases above, an optical deflector, which was designed to have the resonant frequency at 5 kHz, was manufactured. When an alternating current voltage with a peak-to-peak voltage $V_{pp}$ of 20 V at a frequency of 5 kHz was applied to the first piezoelectric elements 8a-8d as the driving signal, the maximum deflection angle of ±5° was obtained.

While this optical deflector was in the normal operation, an external vibration with a frequency of 5 kHz at an acceleration of 500 G was applied to the optical deflector. Against the external vibration, by adding a rotary torque β that reduces the rotary torque α caused by the first piezoelectric elements 8a-8d by applying a second driving signal that is delayed from the first driving signal by π/2 in phase to the second piezoelectric elements 9a-9d, a momentary (impulsive) increase (an abnormal amplitude increase) of the rotation angle of the mirror 1 due to the external vibration was effectively suppressed.

The above-described optical deflectors can be used for image display devices, such as projector-type display systems, etc., light sweeping/scanning systems for image formation, such as the xerographic copier and laser printers, etc., and light sweeping/scanning systems for sensing, such as laser radars, bar code readers, and area sensors, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What we claim are:

1. An optical deflector comprising:
a mirror having a reflective plane;
a torsion bar extending outwardly from an end of said mirror;
a support surrounding said mirror;

a first piezoelectric element, one end of said first piezoelectric element being connected to said torsion bar, the other end of the first piezoelectric element being connected to and supported by said support, said first piezoelectric element having at least one piezoelectric cantilever, the cantilever including a supporting body and a piezoelectric body formed on the supporting body to exhibit bending deformation due to piezoelectricity when a driving voltage is applied to the piezoelectric body, said piezoelectric element rotarily driving said mirror through said torsion bar when said driving voltage is applied; and a second piezoelectric element, one end of said second piezoelectric element being connected to said torsion bar, the other end of the second piezoelectric element being connected to and supported by said mirror.

2. The optical deflector according to claim 1, further comprising a rotation angle detector that detects a piezoelectric electromotive force generated due to bending deformation of said second piezoelectric element to detect a rotation angle of said mirror.

3. The optical deflector according to claim 2, further comprising a controller that controls a driving voltage applied to said first piezoelectric element based on the rotation angle detected by said rotation angle detector.

4. The optical deflector according to claim 1, wherein one or more pairs of said first piezoelectric elements are disposed across said mirror, and a pair of said torsion bars are disposed to extend outwardly from two opposing ends of said mirror in opposite directions, respectively.

5. The optical deflector according to claim 4, wherein one or two pairs of said second piezoelectric elements are disposed face to face across said mirror and across said torsion bars, and each of said second piezoelectric elements has at least one piezoelectric cantilever, each cantilever including a supporting body and a piezoelectric body formed on the supporting body, wherein said second piezoelectric elements generates piezoelectric electromotive forces, respectively, in response to bending deformations of the piezoelectric cantilevers of said second piezoelectric elements, respectively, due to a rotary oscillation of said mirror which is driven by said one or two pairs of said first piezoelectric elements, and wherein the optical deflector further comprises a rotation angle detector that detects the piezoelectric electromotive forces generated due to bending deformations of said second piezoelectric elements to detect a rotation angle of said mirror.

6. The optical deflector according to claim 1, wherein the driving voltage applied to said first piezoelectric elements is an alternating current voltage.

7. The optical deflector according to claim 6, wherein one or more pairs of said first piezoelectric elements are disposed across said torsion bar, and the alternating current voltage applied to the first piezoelectric element on one side of said torsion bar is different from the alternating current voltage applied to the first piezoelectric element on the other side of said torsion bar by 180 degrees in phase.

8. The optical deflector according to claim 1, wherein said mirror, said torsion bar, said support, and said supporting body of the first piezoelectric cantilever are formed integrally by patterning a semiconductor substrate.

9. The optical deflector according to claim 8, wherein the piezoelectric body of said piezoelectric cantilever is formed by patterning a single layer of a piezoelectric film which is formed over said semiconductor substrate.

10. The optical deflector according to claim 9, wherein a reflective plane of said mirror and an electrode of said piezoelectric cantilever are formed by patterning a thin metal film formed over said semiconductor substrate.

11. The optical deflector according to claim 1, further comprising an adjusting unit that applies a driving voltage to said second piezoelectric element to further adjust a rotary drive of said mirror caused by said first piezoelectric element.

12. The optical deflector according to claim 11, wherein said adjusting unit controls the driving voltage applied to said second piezoelectric element so as to increase a deflection angle of the mirror which is rotarily driven.

13. The optical deflector according to claim 11, wherein said adjusting unit controls the driving voltage applied to said second piezoelectric element so as to set a parameter of said rotary drive of said mirror to a predetermined value.

14. An optical deflector comprising:

a mirror having a mirror supporting body having a reflective plane thereon;

a pair of torsion bars extending outwardly from two opposing sides of said mirror supporting body;

a support surrounding said mirror;

one or more pairs of first piezoelectric cantilevers disposed across said torsion bars, each of the first piezoelectric cantilevers including a supporting body and a piezoelectric body formed on the supporting body, one end of each of the first piezoelectric cantilevers being connected to said torsion bar at a respective outward end of said torsion bar, the other end of each of the first piezoelectric cantilevers being connected to and supported by said support, each of the piezoelectric cantilevers, upon application of a driving voltage to the corresponding piezoelectric body, exhibiting a bending deformation due to piezoelectricity so as to rotate said torsion bar, thereby rotarily driving said mirror through said torsion bars; and one or more pairs of second piezoelectric cantilevers disposed across said torsion bars, each of the second piezoelectric cantilevers including a supporting body and a piezoelectric body formed on the supporting body, one end of each of the second piezoelectric cantilevers being connected to said torsion bar adjacent said mirror, the other end of each of the second piezoelectric cantilevers being connected to and supported by said mirror supporting body at its periphery, each of the second piezoelectric cantilever including a pair of electrodes sandwiching the corresponding piezoelectric body to output or receive voltages.

15. The optical deflector according to claim 14, further comprising a rotation angle detector that receives voltage signals outputted from said pairs of electrodes of said second piezoelectric cantilevers to detect piezoelectric electromotive forces generated due to bending deformation of said second piezoelectric cantilevers to thereby detect a rotation angle of said mirror.

16. The optical deflector according to claim 14, further comprising an adjusting unit that applies driving voltages to said pair of electrodes of said second piezoelectric cantilevers to further adjust a rotary drive of said mirror caused by said first piezoelectric cantilevers.

17. The optical deflector according to claim 14, wherein said mirror supporting body, said torsion bars, said support, and said supporting bodies of said first and second cantilevers integrally formed by patterning a semiconductor substrate.

* * * * *